United States Patent [19]

Grohe et al.

[11] 3,852,470

[45] Dec. 3, 1974

[54] DIHALOCYCLOPENTENEDIONE FUNGICIDAL AND BACTERICIDAL AGENTS

[75] Inventors: Klaus Grohe, Odenthal-Erberich; Helmut Kaspers; Hans Scheinpflug, both of Leverkusen, all of Germany

[73] Assignee: Bayer Aktiengesellschaft, Leverkusen, Germany

[22] Filed: Aug. 3, 1972

[21] Appl. No.: 277,826

[30] Foreign Application Priority Data

Aug. 13, 1971 Germany .......................... 2140737

[52] U.S. Cl. ................. 424/331, 424/250, 424/269, 424/275, 424/285, 424/317, 424/330

[51] Int. Cl. ............................................. A01n 9/24

[58] Field of Search .................... 424/331, 317, 330; 260/240 R

[56] References Cited

OTHER PUBLICATIONS

Chemische Berichte, 88, 2,003–11, (1955).

Chemische Berichte, 94, 1,800–13, (1961).

*Primary Examiner*—Albert T. Meyers
*Assistant Examiner*—Leonard Schenkman
*Attorney, Agent, or Firm*—Burgess, Dinklage & Sprung

[57] ABSTRACT

Fungicidal and bactericidal compositions of and methods of combating fungi and bacteria using dihalocyclopentendiones of the formula

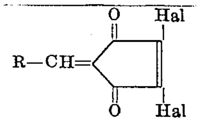

in which R is a vinyl, aryl or hetero-aromatic radical, which radical may optionally be substituted with lower alkyl, lower haloalkyl, benzyl, phenyl, di-(lower alkyl)amino wherein each alkyl group is independently optionally substituted by halogen, halogen, nitro, nitrile, formyl, carboxyl, alkoxycarbonyl, hydroxyl, alkoxy and azolyl, and Hal is halogen are disclosed.

6 Claims, No Drawings

DIHALOCYCLOPENTENEDIONE FUNGICIDAL AND BACTERICIDAL AGENTS

The present invention relates to and has for its objects the provision of fungicidal and bactericidal compositions of certain dihalocyclopentenediones, i.e., 1,2-dihalo-3,5-dioxocyclopentene carrying an optionally substituted allylidene, benzylidene, furfurylidene, thenylidene, or like radical, in the 4-position, in the form of mixtures of such compounds with solid and liquid dispersible carrier vehicles, preferably containing a surface-active agent, and methods for using such compounds in a new way especially for combating pests, e.g., fungi and bacteria, with other and further objects becoming apparent from a study of the within specification and accompanying examples.

As has been known for a long time, zinc ethylene-1,2-bisdithiocarbmate (Compound A) and N-trichloromethylthiotetrahydrophthalimide (Compound B) can, in particular, be used as fungicides in agricultrue and horticulture; the compounds mentioned are of great importance amongst the commercially available products according to R. Wegler "Chemie der Pflanzenschutz-und Schaedlingsbekaempfungsmittel" ("Chemistry of Plant Protection Agents and Pesticides"), volume 2, pages 65 and 108, Berlin/Heidelberg/New York (1970). However, the action is not always satisfactory if low concentrations are used.

It has now been found that the dihalocyclopentenedione derivatives of the formula

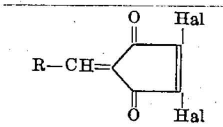

(I)

in which

R is a vinyl, aryl or hetero-aromatic radical, which radical may optionally be substituted with lower alkyl, lower haloalkyl, benzyl, phenyl, di-(lower alkyl)amino wherein each alkyl group is independently optionally substituted by halogen, nitro, nitrile, formyl, carboxyl, alkoxycarbonyl, hydroxyl, alkoxy and azolyl, and Hal is halogen, display strong fungicidal properties, as well as a bactericidal activity.

Preferably, in the above formula, R is vinyl preferably carrying up to three chlorine, bromine, alkyl with up to 4 carbon atoms, phenyl, benzyl or di-(lower alkyl-)amino substituents; aryl preferably carrying at least one fluorine, chlorine, bromine, nitro, alkyl with up to 3 carbon atoms, hydroxyl, alkoxy, formyl, carboxyl, lower alkoxycarbonyl, trifluoromethyl, di-lower alkylamino, di-chloro-lower alkylamino or triazolyl substituents; furyl; thienyl; or a quinoxaline-di-N-oxide radical.

The present invention accordingly provides a fungicidal or bactericidal composition containing as active ingredient a compound of the formula (I) in admixture with a solid or liquefied gaseous diluent or carrier or in admixture with a liquid diluent or carrier containing a surface-active agent.

The present invention also provides a method of combating fungi and phytopathogenic bacteria which comprises applying to the fungi or bacteria or a habitat thereof a compound of the Formula (I), alone or in the form of a composition containing as active ingredient a compound of the Formula (I) in admixture with a diluent or carrier.

As examples of the compounds that can be used according to the invention, the individual compounds listed in the table below may be mentioned:

TABLE 1

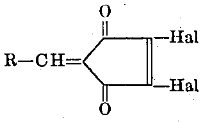

(I)

| Cmpd. No. | R | Hal | Melting point (° C.) |
|---|---|---|---|
| (1) | $C_6H_5$ | Cl | 144–145 |
| (2) | $C_6H_4 \cdot CH_3$-*p* | Cl | 155–156 |
| (3) | $C_6H_4 \cdot Cl$-*p* | Cl | 206–208 |
| (4) | $C_6H_4 \cdot Cl$-*p* | Br | [1] 190.5–192 |
| (5) | $C_6H_4 \cdot Cl$-*p* | I | [1] 212–214 |
| (6) | $C_6H_4 \cdot OCH_3$-*p* | Cl | 166 |
| (7) | $C_6H_4 \cdot NO_2$-*p* | Cl | 207–209 |
| (8) | $C_6H_4 \cdot NO_2$-*p* | Br | 245–246 |
| (9) | $C_6H_4 \cdot NO_2$-*p* | I | 268–270 |
| (10) | $C_6H_4 \cdot NO_2$-*m* | Cl | 216–218 |
| (11) | $C_6H_4 \cdot Br$-*m* | Cl | 168–169 |
| (12) | $C_6H_4 \cdot N(CH_3)_2$-*p* | Cl | 201–205 |
| (13) | $C_6H_4 \cdot N(CH_3)_2$-*p* | Br | 230–231 |
| (14) | 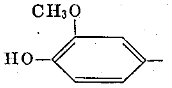 | Cl | 186–187 |
| (15) | $C_6H_5CH{=}CH-$ | Cl | [1] 197–199 |
| (16) | 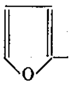 | Cl | 181–183 |
| (17) | 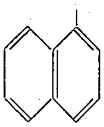 | Cl | 188–189 |
| (18) | 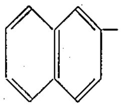 | Cl | 243–244 |
| (19) | 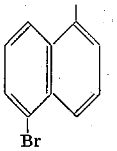 | Cl | 230–232 |
| (20) | $CH_3CH{=}CH-$ | Cl | [1] 126–128 |
| (21) | 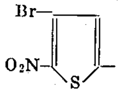 | Cl | 151–152 |
| (22) | 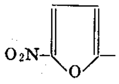 | Cl | 204–205 |
| (23) | 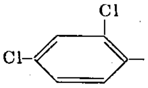 | Cl | 137–138 |
| (24) | 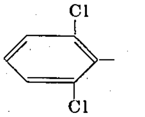 | Cl | 95 |
| (25) | 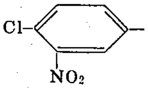 | Cl | 231 |

TABLE 1—Continued

| Cmpd. No. | R | Hal | Melting point (° C.) |
|---|---|---|---|
| (26) | 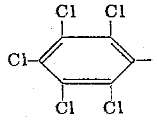 | Cl | 204–206 |
| (27) | 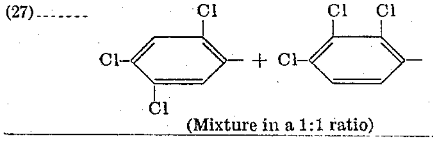 (Mixture in a 1:1 ratio) | Cl | 134–135 |
| (28) | 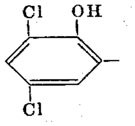 | Cl | [1] 231 |
| (29) | 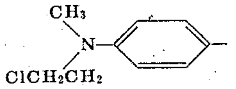 | Cl | 158–159 |
| (30) | 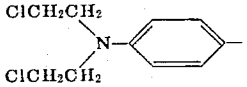 | Cl | 228 |
| (31) | 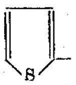 | Cl | 210–211 |
| (32) | 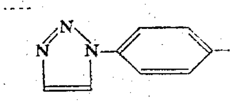 | Cl | [1] 220–222 |
| (33) | 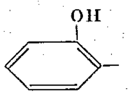 | Cl | [1] 190–191 |
| (34) | 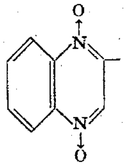 | Cl | [1] 217 |
| (35) | 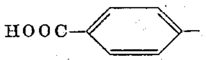 | Cl | 275–280 |
| (36) | 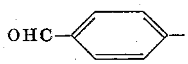 | Cl | 190–192 |

[1] Decomposition.

Compounds (1) to (20) of Table 1 are already disclosed in Chemische Berichte 88, 2,003 (1955) and 94, 1,800 (1961). Compounds (21) to (36) have not previously been described in the literature but can be prepared in accordance with processes that are known in principle. They are obtained if an aldehyde is reacted with a 1,2-dihalo-3,5-dioxocyclopentene-(1). The reaction can be effected by heating, for about 2 to 6 hours, preferably equivalent amounts of the reactants in ethanol (see Example 1 herein), and also in the presence of concentrated sulfuric acid (see Example 2), in which case the reaction time, which at 20°C is about 2 to 5 days, can be shortened to about 2 to 20 hours at 40° to 90°C. The condensation can also be effected by means of boron trifluoride-diethyl ether (see Example 3) at 20° to 50°C or glacial acetic acid-piperidine acetate (see Example 4) at 20° to 60°C over the course of 2 to 4 days. The reaction products are isolated by filtering off the crystals that have separated out at 0°C (see Examples 1, 3 and 4) or by collecting the crystalline precipitates that have formed on dilution with ice-water (see Example 2). Further purification is achieved by recrystallization.

The 1,2-dihalo-3,5-dioxocyclopentenes-(1) used as starting materials are known. They can be obtained in good yield in a multi-stage reaction sequence, starting from hexachlorocyclopentadiene as described in Chemische Berichte, supra.

The active compounds according to the invention display a strong fungitoxic action.

Surprisingly, the dihalocyclopentenedione derivatives that can be used according to the invention display a substantially higher fungicidal action than the active compounds of the prior art; the present invention hence represents an enrichment of the art.

The active compounds do not damage crop plants in the concentrations required for combating fungi and have a low toxicity towards warm-blooded animals. For these reasons, they are suitable for use as plant-protection agents for combating fungi. Fungitoxic agents in plant protection are employed to combat *Archimycetes*, *Phycomycetes*, *Ascomycetes*, *Basidiomycetes* and *Fungi imperfecti*.

The active compounds of the Formula I have a very broad spectrum of action and can be used against parasitary fungi that attack above-ground parts of the plant or that attack the plants through the soil, and also against seedborne pathogens.

The active compounds to be used according to the invention have also proved of value in combating diseases of rice. Thus, they show a very good action against the fungus *Piricularia oryzae*. Surprisingly, the active compounds show not only a protective action but also a curative effect. A bactericidal action is also found, especially against phytopathogenic bacteria such as *Xanthomonas oryzae*.

The active compounds according to the instant invention can be utilized, if desired, in the form of the usual formulations or compositions with conventional inert (i.e. plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides and bactericides, or insecticides, acaricides, rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixtpresent invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100% active substance alone, e.g., about 20–100 percent by weight of the active compound.

Furthermore, the present invention contemplates methods of selectively killing, combating or controlling pests, e.g., fungi and bacteria, which comprises applying to at least one of correspondingly (a) such fungi, (b) such bacteria and (c) the corresponding habitat thereof, i.e., the locus to be protected, a correspondingly combative or toxic amount, i.e., fungicidally or bactericidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular compounds of the present invention are illustrated without limitation, by the following examples:

EXAMPLE 1

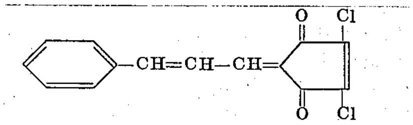

(15)

19.8 g (0.12 mole) of dichlorocyclopentenedione and 15.9 g (0.12 mole) of cinnamaldehyde are treated with sufficient 96 percent-strength ethanol for solution just to occur at the boil. Thereafter the mixture is heated to the boil under reflux for 4 to 5 hours and after cooling to 0°C the reaction product is filtered off and dried in a desiccator. It is purified by recrystallization from carbon tetrachloride. 25.5 g of 1,2-dichloro-3,5-dioxo-4-cinnamylidene-cyclopentene-(1) of melting point 197° – 199°C (with decomposition) are obtained. The yield is 76 percent of theory.

The compounds (3), (6), (14) and (20) can also be prepared analogously to the above example.

EXAMPLE 2

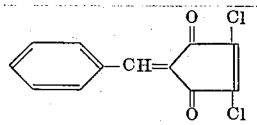

(1)

24.8 g (0.15 mole) of dichlorocyclopentenedione are dissolved in 100 ml of concentrated sulfuric acid at 20° to 50°C. 15.9 g (0.15 mole) of benzaldehyde are then added at 0°C and the mixture is left to stand at room temperature for 3 to 5 days in a small flask closed with a stopper and capillary, with occasional shaking. Ice is then added and the crystalline precipitate is filtered off, rinsed with water and dried in a desiccator. After recrystallization of the crude product from ethanol, 27.4 g of 1,2-dichloro-3,5-dioxo-4-benzylidenecyclopentene-(1) of melting point 148° - 150°C are obtained. The yield is 73 percent of theory.

The compounds (2), (7), (10), (11), (12), (18), (19), (21) to (30) and (32) to (36) can also be prepared analogously to the above example.

EXAMPLE 3

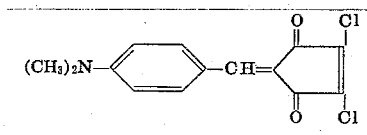

(12)

33 g (0.2 mole) of dichlorocyclopentenedione and 29.8 g (0.2 mole) of 4-dimethylamino-benzaldehyde are dissolved in 250 ml of boron trifluoride-diethyl ether at 45° to 50°C. The mixture is then left to stand for 2 to 4 days at 20°C and the crystals are filtered off and washed with ice-cold methanol. The crude product is recrystallized from ethyl acetate and 52 g of dark red needles of melting point 204° - 205°C are then obtained. The yield of 1,2-dichloro-3,5-dioxo-4-(4'-dimethylaminobenzylidene)-cyclopentene-(1) is 87 percent of theory.

The compound (14) can also be prepared analogously to the above example.

EXAMPLE 4

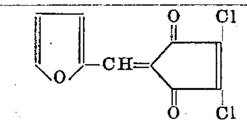

(16)

33 g (0.2 mole) of dichlorocyclopentenedione and 29.8 g (0.2 mole) of furfural are dissolved in 150 ml of glacial acetic acid at 55° to 60°C. 10 to 20 ml of piperidine acetate (prepared from piperidine and glacial acetic acid in a ratio of 1:1.2) are then added at 50°C. Thereafter the mixture is warmed to 50°C for about a further 10 minutes and is left to stand for 2 to 3 days at 20°C. The precipitate is filtered off and dried in a desiccator. The yield is 43.7 g of 1,2-dichloro-3,5-dioxo-4-furfurylidene-cyclopentene-(1), representing 90 percent of theory. The compound shows a melting point of 181°–183°C and can be further purified by recrystallization from carbon tetrachloride.

The compounds (4), (5), (8), (9), (13), (17) and (31) can also be prepared analogously to the above example.

The pesticical activity of the compounds of the Formula I is illustrated in and by the following test Examples.

EXAMPLE 5

Podosphaera test (powdery mildew of apples) [Protective]

| | |
|---|---|
| Solvent: | 4.7 parts by weight acetone |
| Emulsifier: | 0.3 parts by weight alkylaryl polyglycol ether |
| Water: | 95 parts by weight |

The amount of active compound required for the desired concentration of the active compound in the spray liquid is mixed with the stated amount of solvent, and the concentrate is diluted with the stated amount of water which contains the stated additions.

Young apple seedlings in the 4 - 6 leaf stage are sprayed with the spray liquid until dripping wet. The plants remain in a greenhouse for 24 hours at 20°C and at a relative atmospheric humidity of 70 percent. They are then inoculated by dusting with conidia of the apple powdery mildew causative organism (*Podosphaera leucotricha Salm.*) and placed in a greenhouse at a temperature of 21° - 23°C and at a relative atmospheric humidity of about 70 percent.

Ten days after the inoculation, the infestation of the seedlings is determined as a percentage of the untreated but also inoculated control plants.

0 percent means no infestation; 100 percent means that the infestation is exactly as great as in the case of the control plants.

The active compounds, the concentrations of the active compounds and the results obtained can be seen from the following Table:

TABLE 2

*Podosphaera* Test/Protective

| Active compound | Infection in percent of the infection of the untreated control at an active compound concentration (in percent) of— 0.025 | 0.0062 |
|---|---|---|
| (B) 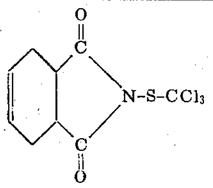 (known) | 100 | 100 |
| (1) 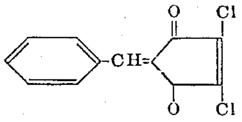 | 13 | 35 |
| (16) 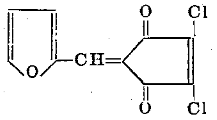 | 6 | 35 |

EXAMPLE 6

Phytophthora test

| | |
|---|---|
| Solvent: | 4.7 parts by weight of acetone |
| Dispersing agent: | 0.3 parts by weight of alkylaryl polyglycol ether |
| Water: | 95 parts by weight |

The amount of the active compound required for the desired concentration of the active compound in the spray liquid is mixed with the stated amount of solvent and the concentrate is diluted with the stated amount of water which contains the stated additions.

Young tomato plants (Bonny best) with 2–6 foliage leaves are sprayed with the spray liquid until dripping wet. The plants remain in a greenhouse for 24 hours at 20°C and at a relative atmospheric humidity of 70 percent. The tomato plants are then inoculated with an aqueous spore suspension of *Phytophthora infestans*. The plants are brought into a moist chamber with an atmospheric humidity of 100 percent and a temperature of 18° - 20°C.

After 5 days the infestation of the tomato plants is determined as a percentage of the untreated but likewise inoculated control plants: 0 percent means no infestation; 100 percent means that the infestation is exactly as great as in the case of the control plants.

The active compounds, the concentrations of the active compounds and the results can be seen from the following Table:

TABLE 3

*Phytophthora* Test

| Active compound | Infection in percent of the infection of the untreated control at an active compound concentration (in percent) of— 0.025 | 0.0062 |
|---|---|---|
| (A)... 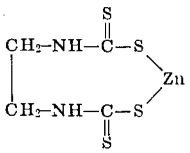 (known) | 6 | 32 |
| (1).... 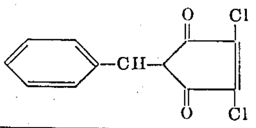 | 1 | 28 |

EXAMPLE 7

Fusicladium test (apple scab) (Curative)

| | |
|---|---|
| Solvent: | 4.7 parts by weight acetone |
| Emulsifier: | 0.3 parts by weight alkylaryl polyglycol ether |
| Water: | 95 parts by weight |

The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are inoculated with an aqueous conidium suspension of the apple scab causative organism (*Fusicladium dendriticum Fuckel*) and incubated for 18 hours in a humidity chamber at 18°–20°C. and at an atmospheric humidity of 100 percent. The plants are then placed in a green house where they dry.

After standing for a suitable period of time, the plants are sprayed dripping wet with the spray liquid prepared in the manner described above. The plants are again placed in a greenhouse.

15 days after inoculation, the infestation of the apple seedlings is determined as a percentage of the untreated but also inoculated control plants.

0 percent means no infestation; 100 percent means that the infestation is exactly as great as in the case of the control plants.

The active compounds, the concentrations of the active compounds, the period of time between inoculation and spraying and the results obtained can be seen from the following Table:

TABLE 4

*Fusicladium* Test/Curative

| Active compound | Dwell time in hours | Infection in percent of the infection of the untreated control at an active compound concentration (in percent) of— 0.1 | 0.025 | 0.0125 |
|---|---|---|---|---|
| (C)... $C_{12}H_{25}NH-C(=NH)-NH_2 \cdot CH_3COOH$ (known) | 42 | 11 | 17 | 30 |
| (1).... 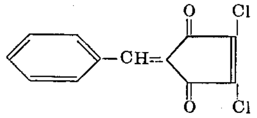 | 42 | 3 | 7 | 26 |

EXAMPLE 8

Fusicladium test (apple scab) (Protective)

| | |
|---|---|
| Solvent: | 4.7 parts by weight acetone |
| Emulsifier: | 0.3 parts by weight alkylaryl polyglycol ether |
| Water: | 95 parts by weight |

The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20°C and at a relative atmospheric humidity of 70 percent. They are then inoculated with an aqueous conidium suspension of the apple scab causative organism (*Fusicladium dendriticum Fuckel*) and incubated for 18 hours in a humidity chamber at 18°–20°C and at a relative atmospheric humidity of 100 percent.

The plants then again come into a greenhouse for 14 days.

15 days after inoculation, the infection of the seedlings is determined as a percentage of the untreated but also inoculated control plants.

0 percent means no infection; 100percent means that the infection is exactly as great as in the case of the control plants.

The active compounds, the concentrations of the active compounds and the results can be seen from Table 5.

EXAMPLE 9

Piricularia test: liquid preparation of active compound

| | |
|---|---|
| Solvent: | 1.9 parts by weight of dimethylformamide |
| Dispersing agent: | 0.1 part by weight of alkylarylpolyglycol ether |
| Water: | 98 parts by weight water |

The amount of active compound required for the desired concentration in the spray liquor is mixed with the stated amount of solvent, and the concentrate is diluted with the stated amount of water containing the stated additive.

30 rice plants about 14 days old are sprayed with the spray liquor until dripping wet. The plants remain in a greenhouse at temperatures of 22° to 24°C and a relative atmospheric humidity of about 70 percent until they are dry. They are then inoculated with an aqueous suspension of 100,000 to 200,000 spores/ml of *Piricularia oryzae* and placed in a chamber at 24°–26°C and 100 percent relative atmospheric humidity.

5 days after inoculation, the infection of all the leaves present at the time of inoculation is determined as a percentage of the untreated but also inoculated control plants. 0 percent means no infection; 100 percent means that the infection is exactly as great in the case of the control plants.

The active compounds, the concentrations of the active compounds and the results can be seen from the following Table:

TABLE 5

*Fusicladium* Test/Protective

| | Active compound | Infection in percent of the infection of the untreated control at an active compound concentration (in percent) of 0.0062 |
|---|---|---|
| (B) | 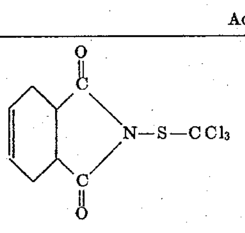 (known) | 23 |
| (1) | 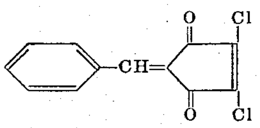 | 6 |
| (16) | 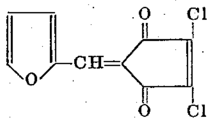 | 0 |
| (23) | 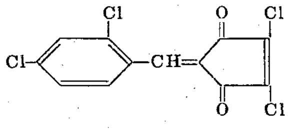 | |
| (27) | 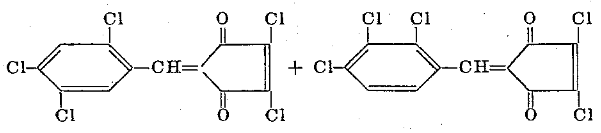 (mixture in a ratio of 1:1) | 0 |
| (28) | 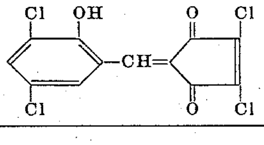 | 3 |

TABLE 6

*Piricularia* Test/Liquid Preparation of Active Compound

| | Active compound | Infection in percent of the infection of the untreated control at an active compound concentration (in percent) of— | |
|---|---|---|---|
| | | 0.05 | 0.025 |
| (B) | 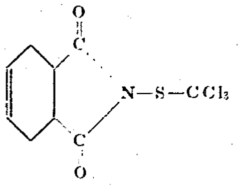 (known) | 75 | 100 |
| (1) | 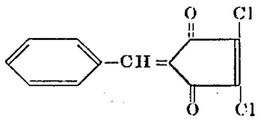 | 0 | 0 |

TABLE 6—Continued

*Piricularia* Test/Liquid Preparation of Active Compound

| Active compound | Infection in percent of the infection of the untreated control at an active compound concentration (in percent) of— | |
|---|---|---|
| | 0.05 | 0.025 |
| (16) 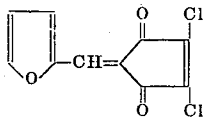 | 0 | 0 |
| (23) 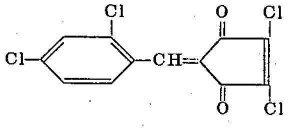 | 0 | 50 |
| (24) 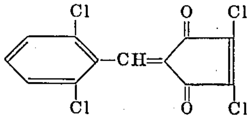 | 0 | 0 |
| (25) 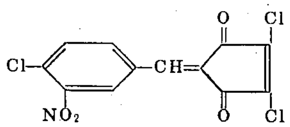 | 0 | 0 |
| (32) 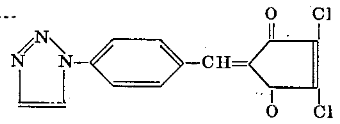 | 0 | 0 |

EXAMPLE 10

Bacteria test: Xanthomonas oryzae

| | |
|---|---|
| Solvent: | 1.9 parts by weight dimethyl formamide |
| Dispersing agent: | 0.1 part by weight alkylarylpolyglycol ether |
| Water: | 98 parts by weight |

The amount of active compound necessary for the desired concentration of active compound in the spray liquor is mixed with the stated amount of the solvent and of the dispersing agent, and the concentrate is diluted with the stated amount of water.

30 rice plants about 30 days old are sprayed with the spray liquor until dripping wet. The plants remain in a greenhouse at temperatures of 22° to 24°C and a relative atmospheric humidity of about 70 percent until they are dry. Needles are then dipped into an aqueous bacterial suspension of *Xanthomonas oryzae* and the plants are inoculated by pricking the leaves. After inoculation, the plants stand in a chamber of 26° to 28°C and 80 percent relative atmospheric humidity.

10 days after inoculation, the infection in the case of all the leaves injured by pricking, inoculated and previously treated with the preparation is determined as a percentage of the untreated but likewise inoculated leaves of the control plants. 0 percent denotes no infection; 100 percent means that the infection is exactly as great as in the case of the control plants.

The active compounds, the concentrations of active compound and the results can be seen from the following Table:

TABLE 7

Bacteria Test/*Xanthomonas oryzae*

| Active compound | Infection in percent of the infection of the untreated control at an active compound concentration (in percent) of— | |
|---|---|---|
| | 0.05 | 0.01 |
| (27) 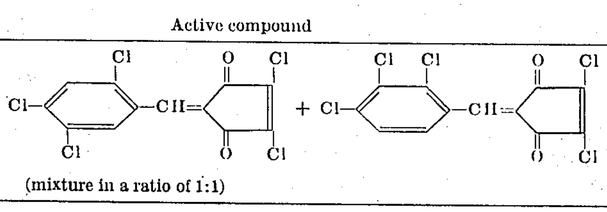 (mixture in a ratio of 1:1) | 0 | 25 |

It will be appreciated that the instant specification and examples are set forth by way of illustration and not limitation, and that various modifications and changes may be made without departing from the spirit and scope of the present invention.

What is claimed is:

1. A method of combating fungi or phytopathogenic bacteria which comprises applying to the fungi or bacteria or a plant habitat thereof, a fungicidally or bactericidally effective amount of at least one dihalocyclopentenedione of formula

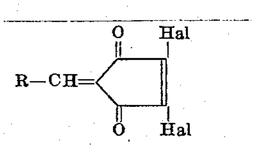

Wherein R is (a) vinyl substituted with alkyl of up to 4 carbon atoms or phenyl; or (b) unsubstituted aryl or aryl substituted with at least one substituent selected from the group consisting of chlorine, bromine, nitro, alkyl of up to 3 carbon atoms, hydroxy, methoxy, formyl, carboxy, di-(lower alkyl)-amino, (lower alkyl) (chloro-lower alkyl) amino and di-(chloro-lower alkyl) amino, and Hal is halogen.

2. The method according to claim 1 wherein said dihalocyclopentenedione is 1,2-dichloro-3,5-dioxo-4-benzylidenecyclopentene-1 of the formula

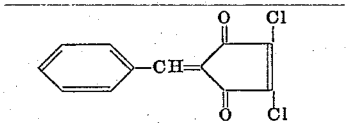

3. The method according to claim 1, wherein said dihalocyclopentenedione is 1,2-dichloro-3,5-dioxo-4-(2',6'-dichlorobenzylidene)-cyclopentene-1 of the formula

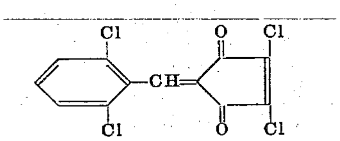

4. The method according to claim 1 wherein said dihalocyclopentendione is 1,2-dichloro-3,5-dioxo-4-(3'-nitro-4'-chlorobenzylidene)-cyclopentene-1 of the formula

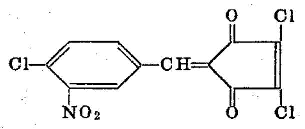

5. The method according to claim 1 wherein said dihalocyclopentendione is a mixture of equal amounts of 1,2-dichloro-3,5-dioxo-(2',3',4'- and 2', 4', 5'-trichloroebenzylidene)-cyclopentene-1 of the formulae

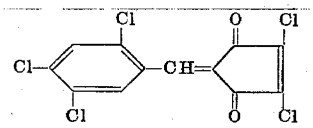

and

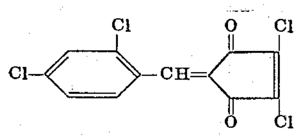

6. The method according to claim 1 wherein said dihalocyclopentenedione is 1,2-dichloro-3,5-dioxo-4-(2'-hydroxy-3', 5'-dichlorobenzylidene)-cyclopentene-1 of the formula

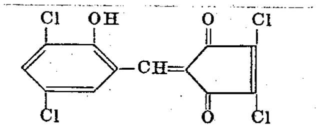

* * * * *

PO-1050
(5/69)

UNITED STATES PATENT OFFICE
CERTIFICATE OF CORRECTION

Patent No. 3,852,470 Dated December 3, 1974

Inventor(s) Klaus Grohe et al

It is certified that error appears in the above-identified patent and that said Letters Patent are hereby corrected as shown below:

Col. 5, line 48, cancel line in entirety and substitute

-- mixture. Thus, the present invention contemplates --.

Col. 12, Table 5, Compound (23), in last column of Table, insert -- 1 --.

Col. 12, Table 6, cancel Compound (B) and substitute

-- 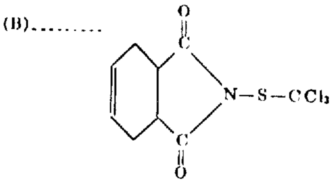 --.

Col. 16, Claim 5, second structural formula, correct to read as follows:

-- 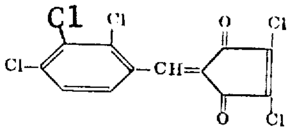 --.

Signed and Sealed this

*ninth* Day of *September 1975*

[SEAL]

*Attest:*

RUTH C. MASON
*Attesting Officer*

C. MARSHALL DANN
*Commissioner of Patents and Trademarks*